(12) United States Patent
Winget et al.

(10) Patent No.: US 7,909,379 B2
(45) Date of Patent: Mar. 22, 2011

(54) KIT AND BULKHEAD ASSEMBLY FOR CARGO VEHICLES

(75) Inventors: Larry J. Winget, Leonard, MI (US); Darius J. Preiser, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 70 days.

(21) Appl. No.: 12/212,700

(22) Filed: Sep. 18, 2008

(65) Prior Publication Data

US 2010/0066114 A1    Mar. 18, 2010

(51) Int. Cl.
*B60N 3/00* (2006.01)
*B60P 9/00* (2006.01)

(52) U.S. Cl. ................................. 296/24.43; 410/129

(58) Field of Classification Search ........... 296/24.4, 296/24.41, 24.43, 24.46; 410/129, 130
See application file for complete search history.

(56) References Cited

U.S. PATENT DOCUMENTS

| | | | |
|---|---|---|---|
| 5,069,497 A | 12/1991 | Clelland | |
| 5,080,416 A | 1/1992 | Dirck | |
| 5,139,596 A | 8/1992 | Fell | |
| 5,246,261 A | 9/1993 | McCormack | |
| 5,340,183 A * | 8/1994 | Horian | 296/24.4 |
| 5,357,143 A | 10/1994 | Lehr et al. | |
| 5,683,782 A | 11/1997 | Duchene | |
| 6,050,630 A | 4/2000 | Hochet | |
| 6,142,550 A | 11/2000 | Blyth et al. | |
| 6,357,979 B1 | 3/2002 | Montagna et al. | |
| 6,435,577 B1 | 8/2002 | Renault | |
| 6,474,713 B1 | 11/2002 | Ruck et al. | |
| 6,537,413 B1 | 3/2003 | Hochet et al. | |
| 6,655,299 B2 | 12/2003 | Preisler et al. | |
| 6,682,675 B1 | 1/2004 | Vandangeot et al. | |
| 6,682,676 B1 | 1/2004 | Renault et al. | |
| 6,710,133 B2 | 3/2004 | Gebreselassie et al. | |
| 6,748,976 B2 | 6/2004 | Sato et al. | |
| 6,790,026 B2 | 9/2004 | Vandangeot et al. | |
| 6,823,803 B2 | 11/2004 | Preisler | |
| 6,843,525 B2 | 1/2005 | Preisler | |
| 6,877,940 B2 | 4/2005 | Nelson et al. | |
| 6,890,023 B2 | 5/2005 | Preisler et al. | |
| 6,981,863 B2 | 1/2006 | Renault et al. | |
| 7,318,614 B2 | 1/2008 | Steiger et al. | |
| 2002/0043747 A1 | 4/2002 | Vismara | |
| 2003/0141731 A1 | 7/2003 | Betts et al. | |
| 2004/0241383 A1 | 12/2004 | Watanabe et al. | |
| 2005/0189674 A1 * | 9/2005 | Hochet et al. | 264/138 |
| 2008/0179459 A1 * | 7/2008 | Garcia Laja et al. | 244/119 |
| 2009/0072086 A1 * | 3/2009 | Smith et al. | 244/119 |
| 2010/0014935 A1 * | 1/2010 | Jevaney | 410/129 |

* cited by examiner

*Primary Examiner* — Dennis H Pedder
(74) *Attorney, Agent, or Firm* — Brooks Kushman P.C.

(57) ABSTRACT

A kit from which a plurality of parts are selected and arranged in a cargo vehicle to obtain bulkhead assembly for the cargo vehicle is provided. The assembly partitions or divides a cargo area from a driver area in the vehicle. The kit includes a reinforced composite first panel of a cellular core sandwich-type for positioning proximate a first side of and within the vehicle. The kit also includes a reinforced composite second panel of a cellular core sandwich-type. The second panel includes a first portion for positioning proximate a second side of and within the vehicle, a door portion disposed between the first panel and the first portion and a living hinge portion disposed between the first and door portions to allow the door portion of the second panel to pivot between open and closed positions to allow the driver to move between the areas in the open position of the door portion.

16 Claims, 4 Drawing Sheets

KIT AND BULKHEAD ASSEMBLY FOR CARGO VEHICLES

CROSS-REFERENCE TO RELATED APPLICATIONS

This application is related to U.S. patent application entitled "Method And System For Making Cellular Parts And Thermoplastic Composite Articles Utilizing Same" filed Apr. 17, 2008 and having U.S. Ser. No. 12/104,698.

BACKGROUND OF THE INVENTION

1. Field of the Invention

This invention relates to kits and bulkhead assemblies to divide or partition a cargo area from a driver area in a cargo vehicle.

2. Background Art

The driver compartment of a cargo vehicle can be viewed as the forward portion of the cargo compartment of the vehicle in which seats are installed. So configured, the driver and any passenger are exposed to relatively high noise levels. The heating and, if so equipped, air conditioning, can be problematic inasmuch as typically only the driver and passenger area must be heated or air conditioned, but because the interior of the van is open, the entire interior of the van will load the heating or cooling system. Frequently such systems are incapable of handling the heating or cooling load of the entire vehicle.

Unsecured cargo may move about the interior of the van and hit the driver's and passenger's seats or their occupants. During a panic stop, motion of unsecured cargo can be both significant and problematic.

Cargo vehicles, such as commercial vans and the like, typically have a bulkhead separating the driver and passenger space from the cargo space. Bulkheads separate the driver and passenger space from the cargo space by extending from one side of the vehicle to the other and from the floor of the vehicle to the ceiling. Bulkheads typically consist of a one-piece sheet metal design, but could also be a multi-piece assembly such that two large stampings spot welded together form a box beam where the upper and lower portions overlap. Plywood and high strength plastics have also been used for bulkheads. Bulkheads also often have a portion cut out near the top so as to serve as a window for the driver to see into the cargo space and beyond the rear of the vehicle via use of the rearview mirror.

Figure 1:
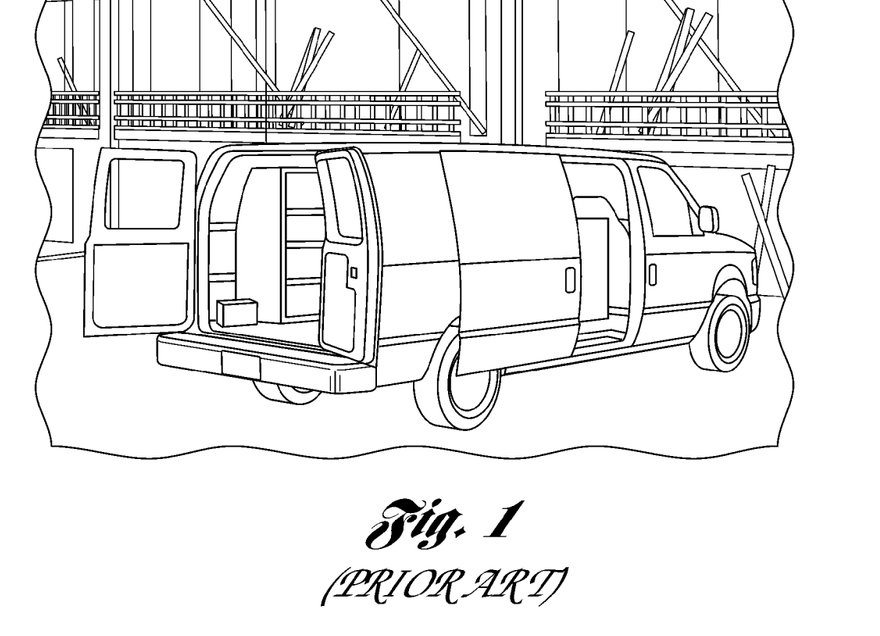
FIG. 1 is a perspective view of a prior art cargo vehicle such as a cargo van at a work site with many of its doors open.

Many workers use specialized tools and equipment in performing their daily tasks. Because many job sites are away from the job shop, any tools and equipment needed must be transported to the job site. A worker typically requires a vehicle large enough to accommodate the tools, equipment and supplies required at the job site. As illustrated in FIG. 1, a problem associated with such vehicles is that there is typically not a huge amount of space in such vehicles. Electricians, telephone repairers, cable installers, and plumbers must carry an assortment of tools, fasteners, pipes and other supplies to be adequately prepared to complete a job or service call. Accordingly, it will be appreciated that it would be highly desirable to have a vehicle with a maximum amount of cargo area for tools, supplies and equipment so that a worker can efficiently transport the required items to the job site.

Figure 2:
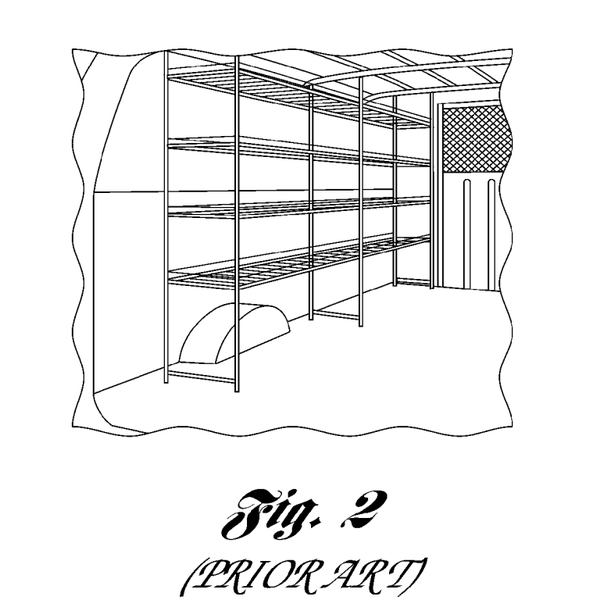
FIG. 2 is a perspective view, partially broken away, of the interior of a cargo van with a prior art shelving system and a prior art bulkhead assembly.
Figure 3:
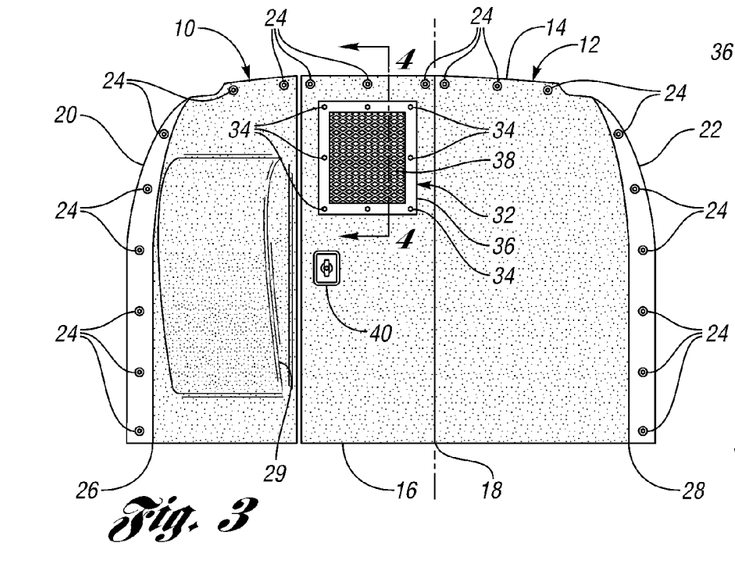
FIG. 3 is a rear elevational view of a bulkhead assembly assembled from a kit constructed in accordance with one embodiment of the present invention.

FIG. 2 shows a wire frame shelving system and a prior art bulkhead assembly within a cargo van.

The following U.S. patent documents disclose various bulkheads for vehicles: U.S. Pat. Nos. 5,069,497; 5,080,416; 5,246,261; 5,357,143; 6,142,550; 6,357,979; 6,474,713; 6,877,940; and 2003/0141731.

U.S. Pat. No. 7,318,614 discloses a bulkhead assembly for a vehicle comprising a first panel adjacent and substantially perpendicular to a street-side wall of the vehicle, a second panel adjacent and substantially perpendicular to a curb-side wall of the vehicle, and a door panel disposed between the first and second panels. Support or attachment brackets attach the assembly the vehicle. The door panel is hingedly attached to one of the first and second panels. The hinge is created via cylinder-shaped projections that extend from and are integral with an edge of one panel and cylinder-like projections that extend from and are integral with a hinged edge of the door panel. Each of the projections include a slot. The cylinder projections are positioned to fit in between or adjacent cylinder projections on the panel. A hinge pin is inserted through slots of the cylinder projections to hingedly connect the door panel to the panel. The door panel may be hingedly connected to one of the panels by a separate hinge assembly that is individually fastened to each of the door panel and one of the first or second panels. Other hinge structures such as several discrete hinges or a piano hinge may be used.

These additional steps and materials add to the cost and time to manufacture the bulkhead assembly. Further, if any part of the bulkhead assembly is non-recyclable it must be removed before the assembly is recycled.

Due to increasing federal environmental regulations and decreasing availability of landfill space, there is increased interest in recycling post-consumer products such as vehicle interior trim panels. Unfortunately, many conventional vehicle interior articles are formed from non-recyclable materials such as thermosetting resins, which cannot be re-melted and reused.

Thus, there is a need for recyclable vehicle interior articles that have durable, tough surfaces, that are impervious to water and most chemicals, and that are designed to be scratch and mar resistant. In addition, there is a need for recyclable vehicle interior articles that can reduce external noises (e.g., road noise, engine noise, vibrations, etc.), as well as noises emanating from within passenger or cargo compartments, while also being lightweight and low in cost. U.S. Pat. No. 6,710,133 discloses a vehicle interior article including a layer of recyclable polymeric material.

One type of recyclable, lightweight, high-strength, composite material or article comprises a "honeycombed" cellular core positioned between two thermoplastic skins reinforced with glass and polypropylene. Polypropylene is highly regarded for its heat and chemical resistance as well as for its ability to withstand wear and tear. The thermoplastic skins, tough and meltable for reuse, have a degree of elasticity between 5 and 20 GPa, depending on fiber content and orientation. The composite article typically ranges in thickness between 5 and 30 mm. Its weight ranges from 1700 to 6000 $g/m^2$, depending on skin and core materials.

In contrast to more conventional thermoset resin composites, thermoplastics used in the composite article provide greater robustness due to their tougher matrix. They also offer enhanced formability and functional integration, consist of less expensive raw materials and can be processed faster. Also, living hinges (i.e., U.S. published application 2005/0189674) and deep draw shapes (i.e., U.S. Pat. Nos. 6,682,675; 6,682,676; 6,790,026; and 6,981,863) can be made with the composite article while maintaining structural integrity.

Via thermocompression, production is a one-step process that takes approximately one minute (i.e., U.S. Pat. Nos. 6,050,630 and 6,537,413). Simultaneous exposure to heat and pressure changes the "sandwich" to a thermoplastic composite, yielding high-strength-to-weight and high-stiffness-to-weight properties as well as a finished product that is highly resistant to heat, impact and corrosion.

Applications for such thermoplastic composite materials or articles include pallets (i.e., U.S. Pat. Nos. 6,655,299; 6,748,876; and 6,823,803), vehicle load floors (i.e., U.S. Pat. No. 6,843,525), under-engine fairings (U.S. Pat. No. 6,435,577), inner roof panels (U.S. Pat. No. 6,890,023), trunk panels, backrests, aerodynamic skid plates, spare wheel pans, and front and rear vehicle bumpers.

One way to make the interior plastic cellular core or honeycomb part is to make the core from a plurality of small co-extruded tubes bonded to each other along their sides (i.e., U.S. Pat. No. 5,683,782). The small tubes have a base body made of a thermoplastic and which, at least on the outside, preferably on the outside and on the inside, carries a coating made of an adhesively-active thermoplastic material. As a result of this coating, a bonding of the small honeycomb tubes to each other as well as to a cover layer is possible.

Another way to make a plastic cellular or honeycomb part is to make the fiber-reinforced thermoplastic honeycomb in a continuous manner one half cell at a time by laying down a corrugated web of thermoplastic, with and without fiber-reinforcement atop a honeycomb, selectively fusing the node-antinode demes and repeating the process until a honeycomb of the desired depth is prepared (i.e., U.S. Pat. No. 5,139,596).

Yet still another way to make a plastic cellular or honeycomb part is to injection mold the honeycomb part in plastic (U.S. published application Nos. 2002/0043747 and 2004/0241383).

SUMMARY OF THE INVENTION

An object of at least one embodiment of the present invention is to provide a kit and a bulkhead assembly to divide or partition a cargo area from a driver area in a cargo vehicle, wherein the bulkhead assembly is quiet, strong, easy to install and/or remove, lightweight and recyclable.

In carrying out the above object and other objects of the present invention, a kit from which a plurality of parts are selected and arranged in a cargo vehicle to partition or divide a cargo area from a driver area in the vehicle is provided. The kit includes a reinforced composite first panel of a cellular core sandwich-type for positioning proximate a first side of and within the vehicle and a reinforced composite second panel of a cellular core sandwich-type. The second panel includes a first portion for positioning proximate a second side of and within the vehicle, a door portion disposed between the first panel and the first portion and a living hinge portion disposed between the first and door portions to allow the door portion of the second panel to pivot between open and closed positions to allow the driver to move between the areas in the open position of the door portion.

At least one of the panels may include an attachment portion for attaching the at least one of the panels to one of the sides of the vehicle.

At least one of the panels may include a living hinge portion for hingedly connecting the attachment portion to the rest of the at least one of the panels.

At least one of the panels may include a skin made of reinforced thermoplastics material. The skin may at least partially form the living hinge portion of the at least one of the panels.

The cargo vehicle may be a cargo van.

Each of the panels may be made of a recyclable thermoplastics material.

Each of the panels may be constructed mainly of polyolefin and preferably polypropylene.

Each of the panels may include a first skin having an inner surface and an outer surface. The skin may be made of reinforced thermoplastics material. A cellular core may be bonded to the inner surface of the first skin and may be made of a thermoplastics material. A second may have an inner surface and an outer surface. The inner surface of the second skin may be bonded to the cellular core. The second skin may be made of reinforced thermoplastics material. One of the skins of the second panel may at least partially form the living hinge portion.

The cellular core may have a honeycomb-like structure.

The kit may further include an outer covering layer disposed on the outer surface of at least one of the skins of at least one of the panels.

The covering layer may be made of a woven or non-woven fabric and the at least one of the panels may be carpeted.

One of the panels may be a deep-drawn panel having a cavity with a width sufficient to accommodate a seat back when the seat back is moved into a reclined position in the driver area.

One of the panels may define a cut-out window area.

The kit may further include a window covering which covers the window area.

The skins may be made of a woven fabric or a mat of glass fibers and of the thermoplastics material.

The thermoplastics material of the skins may be polyolefin and, preferably, polypropylene.

The cellular core may have an open cell structure of the tubular or honeycomb cell type, constituted mainly of polyolefin and, preferably, polypropylene.

The open cells may have a diameter in the range of 2 mm to 10 mm.

Further in carrying out the above object and other objects of the present invention, a bulkhead assembly for cargo vehicles is provided. The assembly includes a reinforced composite panel of a cellular core sandwich-type for positioning proximate a first side of and within the vehicle and a reinforced composite second panel of a cellular core sandwich-type. The second panel includes a first portion for positioning proximate a second side of and within the vehicle, a door portion disposed between the first panel and the first portion and a living hinge portion disposed between the first and door portions. The assembly partitions or divides a cargo area from a driver area in the vehicle and the living hinge portion allows the door portion to pivot between open and closed positions to allow the driver to move between the areas in the open position of the door portion.

Each of the panels may include an attachment portion for positioning proximate one of the sides of the vehicle for attaching its respective panel to one of the sides of the vehicle and each of the panels may include a living hinge portion for hingedly connecting its attachment portion to the rest of its panel.

The above object and other objects, features, and advantages of at least one embodiment of the present invention are readily apparent from the following detailed description of the best mode for carrying out the invention when taken in connection with the accompanying drawings.

DETAILED DESCRIPTION OF THE PREFERRED EMBODIMENT(S)

In general, at least one embodiment of the present invention relates to a kit and a bulkhead assembly to partition or divide a cargo area from a driver area in a cargo vehicle. Each kit and resulting assembly includes a pair of reinforced composite panels of the cellular core sandwich-type. The kit and assembly are specifically designed for use in cargo vans/vehicles. Metal bulkheads and bulkheads having non-recyclable parts of the prior art are replaced with high performance, low cost, lightweight, all-plastic panels which are not only user friendly but also less noisy. The panels are also easy to install and/or remove. The panels offer the end user a quiet, strong and recyclable alternative to metal bulkheads at an affordable price. The assembly and kit include a pair of reinforced composite panel of the cellular core sandwich-type to achieve a strong, lightweight and user friendly bulkhead assembly and kit that is "green" to the marketplace. The panels have a strength-to-weight ratio typically greater than steel and are quieter than steel (as well as hollow plastic parts such as blow molded plastic parts), easily adjustable in the field and are fully recyclable.

A kit from which a plurality of parts are selected and arranged to divide or partition a cargo area from a driver area in a cargo vehicle is provided, as shown in FIGS. 3-5 and 8-9. The kit includes two plastic panels, generally indicated at 10 and 12. Each of the panels 10 and 12 preferably comprises a reinforced composite panel of the cellular core sandwich-type and having at least one living hinge portion.

Figure 5:
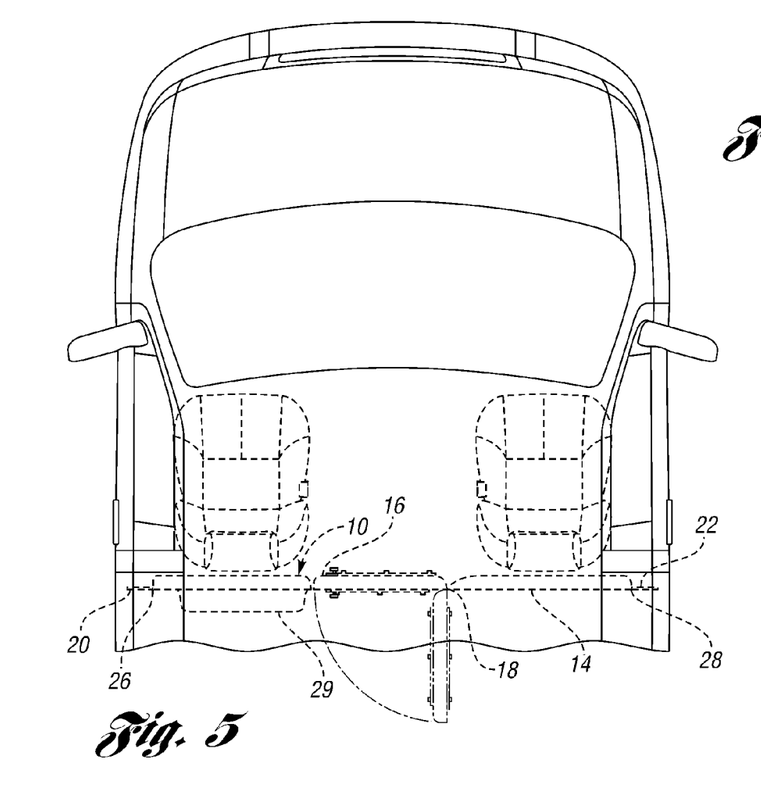
FIG. 5 is a top plan view, partially broken away, of the assembly of FIG. 3 with the door portion in open and closed positions indicated by phantom lines and secured within a cargo vehicle (with its roof removed) immediately behind seats of the vehicle which are also indicated in phantom.

The reinforced composite first panel 10 is positioned proximate a first side of and within the vehicle such as the vehicles of FIGS. 1, 2, 5, 8, and 9. The reinforced composite second panel 12 includes a first portion 14 for positioning proximate a second side of and within the vehicle, a door portion 16 disposed between the first panel 10 and the first portion 14 and a living hinge portion 18 disposed between the first and door portions 14 and 16, respectively, to allow the door portion 16 of the second panel 12 to pivot between open and closed positions, as illustrated in FIG. 5, to allow the driver to move between the areas in the open position of the door portion 16.

At least one and preferably both of the panels 10 and 12 include an attachment portion 20 and 22, respectively, for attaching the panels 10 and 12 to the sides of the vehicle. Fasteners, such as bolts 24, extend through the attachment portions 20 and 22, and fasten the attachment portions 20 and 22 to the sides of the vehicle. At least one and preferably both of the panels 10 and 12 include a living hinge portion 26 and 28, respectively, for hingedly connecting the attachment portions 20 and 22 to the rest of their respective panels 10 and 12.

The height, width, thickness, and overall design of the individual panels 10 and 12 of the bulkhead assembly may be selected as desired for a particular purpose or intended use. The end portions of the panels 10 and 12 adjacent the living hinge portions 26 and 28, respectively, near the walls of the vehicle may be shaped, angled, rounded, or tapered to more closely conform to or mimic the inner shape of the vehicle walls.

Figure 9:
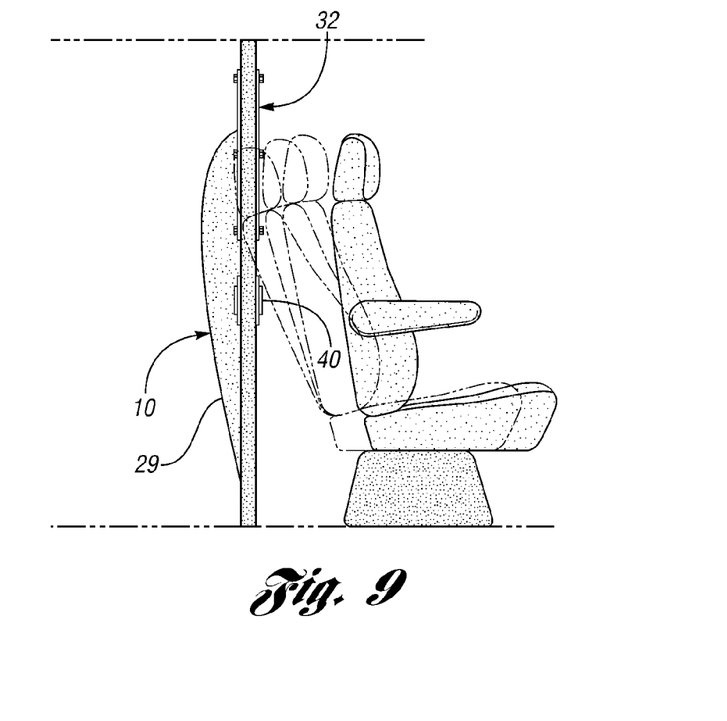
FIG. 9 is a side view of the assembly including the deep-drawn portion and an adjacent vehicle seat in different reclining positions.

One of the panels 10 and 12, such as the panel 10, is a deep-drawn panel having a cavity 29 with a width sufficient to accommodate a seat back when the seat back is moved into a reclined position in the driver area, as shown in FIGS. 9. The cavity 29 is preferably formed as described in U.S. Pat. Nos. 6,682,675; 6,682,676; 6,790,026; and 6,981,863.

Figure 4:
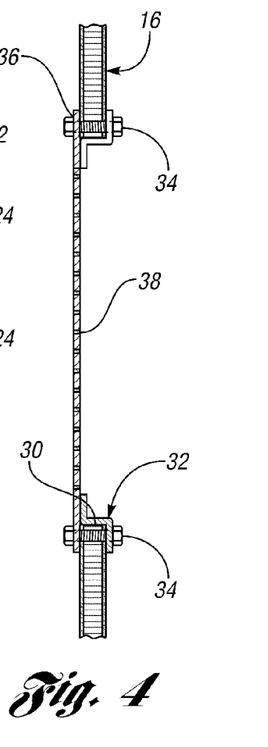
FIG. 4 is a view, partially broken away and in cross-section, taken along lines 4-4 of FIG. 3.

One of the panels 10 and 12, such as the panel 12, defines a cut-out window area 30 in the door portion 16, as best seen in FIG. 4. The kit includes a window covering, generally indicated at 32, which covers the window area 30. The window covering 32 is secured about the window area 30 by fasteners, such as bolts 34. The bolts 34 extend through a peripheral flange portion 36 of the covering 32 and through the door portion 16 about the window area 30. The window covering 32 may include a plastic mesh screen 38 through which the driver can see.

The door portion 16 typically includes a handle 40 so that the driver can move the door portion 16 between the open and closed positions of FIG. 5.

Each of the panels 10 and 12 is capable of withstanding 250 pounds of force with not more than 8 mm of deflection.

Figure 6:
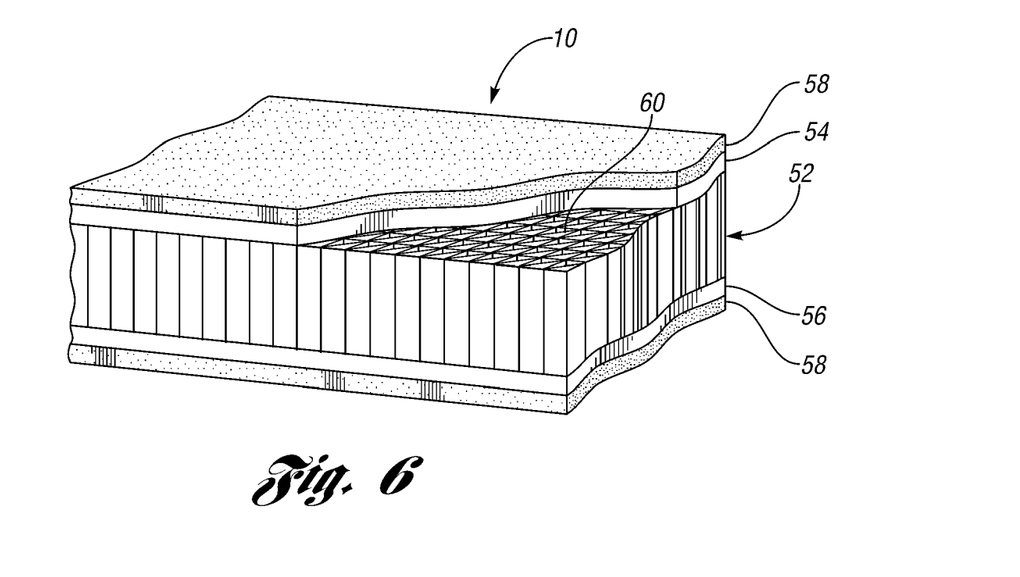
FIG. 6 is a perspective schematic view, partially broken away, of a thermoplastic composite panel with a plastic cellular part or core having open cells for use as a plastic panel constructed in accordance with an embodiment of the present invention.

There is illustrated in FIG. 6 a portion of the composite panel 10 which includes a cellular core or part, generally indicated at 52. The article 10 also includes one or more upper skin layers and one or more lower skin layers 54 and 56, respectively, made of a reinforced thermoplastics material. In addition, the panel 10 may include one or more outer covering layers 58 made of a woven or non-woven material disposed on the upper skin layer 54 (and on the lower skin layer 56 if more than one outer covering layer is included). The outer covering layer(s) 58 maybe made of felt or carpeting, such as polypropylene carpeting.

Figure 7:
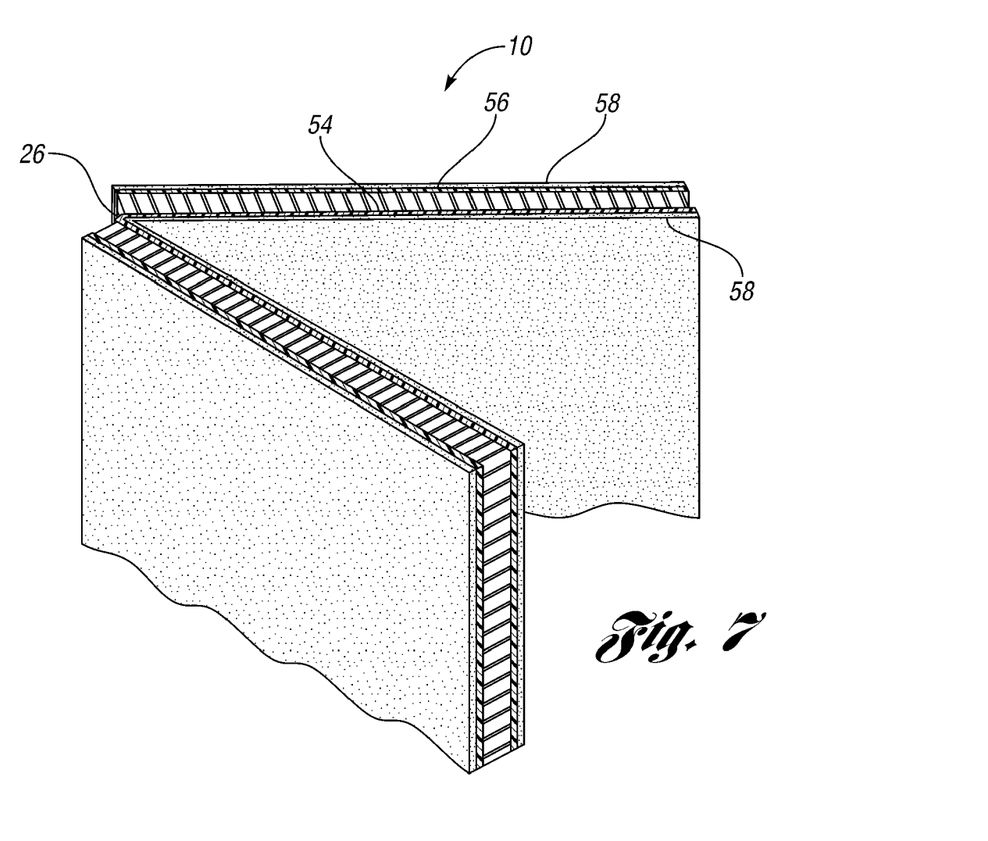
FIG. 7 is a perspective view, partially broken away and in cross-section, of two portions of a reinforced composite panel with a living hinge portion disposed therebetween.
Figure 8:
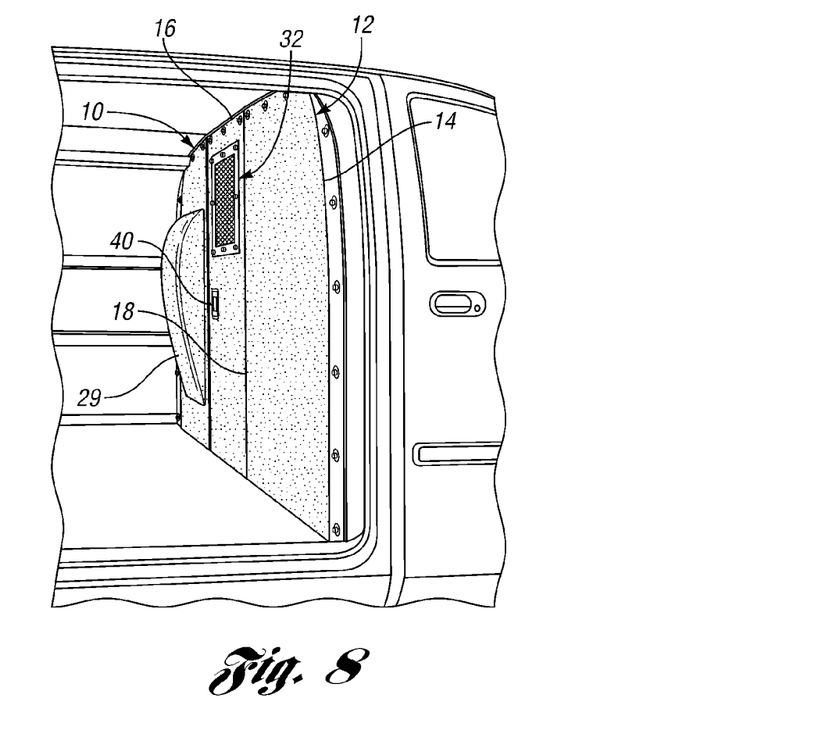
FIG. 8 is a side perspective view, partially broken away, of the assembly positioned within the vehicle to more particularly show the deep-drawn portion of one of the panels.

Both of the panels including the panel 10 include a skin (54 of FIGS. 6 and 7) made of reinforced thermoplastics material. The skin 54 may at least partially form the living hinge portion 26 of the panel 10. The living hinge portion 26 (as well as the living hinge portions 28 and 18) are preferably formed as described in U.S. 2005/0189674.

Materials Used for the Skin Layers 54 and 56

The skin materials are preferably made of a polyolefin such as polypropylene reinforced with fibers. However, other materials can also be used.

The properties of the skin layers 54 and 56 depend on:
Glass content (typically 20 wt % to 60 wt %);
Glass orientation, woven 50/50 or 80/20 as needed for loads;

Structure of the reinforcement (continuous woven fibers, continuous UD fibers, random glass mats, chopped glass fibers, etc.) and the core 52; and Thickness, which depends on load and application but generally not to exceed 30 mm and at least 5 mm.

Each skin layer 54 or 56 is characterized by its weight per surface area within a range of typically 400 to 1500 g/m².

Some examples of the materials used for the skin layers 54 and 56 are:

Woven co-mingled fibers. Glass fibers and polypropylene fibers are co-mingled to form a hybrid roving. The process yields a product in which the glass fibers and thermoplastic fibers are uniformly dispersed. This co-mingling technique allows for a high glass fiber content (60 to 75 wt %) because it ensures a good fiber wetting by the matrix. Adequate wetting of the glass fibers ensures high mechanical performance of the composite article 110. Hybrid rovings are then woven with several possible orientations. When the roving is heated above the melting point of the thermoplastic fibers, the thermoplastic flows around the glass fibers. The uniform co-mingling of the glass and thermoplastic fibers limits the distance the thermoplastic is required to flow and allows the material to be molded with very low pressures (about 10 bars to a maximum of about 30 bars). A commercial material is Twintex manufactured by Vetrotex Saint Gobain. Twintex is typically preconsolidated before being used in the process.

Mat of fibers with PP. It is a thin, continuous roll stock made of partially-consolidated polypropylene reinforced with fiber glass mat. Many thicknesses are available from a glass basis weight of 80 g/m² up to 1000 g/m². Glass content can vary from 20% by weight to 50% or more. The glass fibers are in a random configuration. It is also possible to use other types of fibers such as natural fibers, carbon fibers, and aramid fibers.

The cellular core 52 has an open-celled structure of the honeycomb cell type, constituted mainly of polyolefin and, preferably, polypropylene. Referring to the above-noted application, there is disclosed one method of making the plastic cellular part or core 52 by injection molding. However, it is to be understood that there are other ways to make the core 52 as illustrated by the prior art.

The method of the above-noted application includes providing a mold having a mold cavity with an interior surface to define the shape of the cellular part 52 and at least one resin flow path extending from an outer surface of the mold to the mold cavity. A first set of projections or pins extend from the interior surface of the upper mold half into the mold cavity from a first direction and touch or almost touch the interior surface the lower mold half. A second set of projections or pins extend into the mold cavity from a second direction opposite the first direction. The projections define cells 60 of the part 52 which open to opposing outer surfaces of the cellular part 52.

The mold cavity is filled by an injection molding machine with the sets of projections and extending into the mold cavity, with molten plastic resin from the machine flowing along at least one resin flow path to the mold cavity. A manifold such as a hot runner manifold may be used to provide a number of drops into the mold cavity. The resulting cellular part or core 52 is removed from the mold cavity of the mold after the cellular part 52 hardens.

The cells 60 may have a triangular configuration or the cells 60 may form a honeycomb including cylindrical, hexagonal, or square cells. Other shapes are also possible. The axes of the cells 60 are perpendicular to the outer surfaces of the core 52 as well as the skin layers 54 and 56 of the article 10. Cell density is adjusted as needed for load. The open cells 60 typically have a diameter in a range of 2 mm to 10 mm.

In the method of making an article 10, a stack of skin layers 54 and 56 and the core 52 (and the layer(s) 58 if desired) are preferably pre-assembled. Then, the pre-assembled stack is heated in an oven (not shown). The pre-assembled stack is heated such that the skin layers 54 and 56 of the stack have a forming temperature approximately in the range of 120° C. to 200° C. The temperatures to which the pre-assembled stack is heated are higher than the degradation temperature of the polypropylene constituting the matrices of the skin layers 54 and 56, as well as the cellular core 52, but that does not degrade the mechanical characteristics of the resulting article 10.

The temperature to which the pre-assembled stack is heated in the method of making the article 10 lies in a range extending from a low temperature enabling the skin layers 54 and 56 to be bonded to the cellular core 52, in a time compatible with mass production constraints, without the cellular core 52 of the stack being weakened accordingly, to a maximum temperature while avoiding degrading the polypropylene too rapidly.

Generally, the quantity of heat transmitted through the skin layers 54 and 56 and the cellular core 52 is inversely proportional to the thickness of the skin layers 54 and 56.

For a given pre-assembled stack temperature and a given pre-assembled stack-heating time, it is possible to bond a skin layer of given thickness. If the skin layer is too thin, it reaches a temperature such that it is degraded. If the skin is too thick, the heat does not arrive in sufficient quantity to enable the skin layers and the core to be bonded together.

For example, in order to bond a skin layer made of a 4×1 woven fabric of weight per unit area of 915 g/m² to a cellular core, provision is made for the heating time to lie in the range 55 seconds to 75 seconds. By using an identical skin of weight per unit area of 1,420 g/m², a heating time lying in the range of 70 seconds to 85 seconds is necessary to bond the skin layer to the cellular core without degrading it. Similarly, it has been determined that, for an identical skin layer having a weight per unit area of 710 g/m², a heating time lying in the range 55 seconds to 65 seconds is necessary to bond it to the cellular core without degrading it.

Referring again to the above-noted application, a compression or cold-pressing mold for making the article 10 is disclosed. The compression mold includes first and second mold halves between which is placed a stack comprising heated blanks of glass-reinforced thermoplastic sheets or layers 54 and 56 which sandwich the core 52 therebetween. The stack of materials are pressed between cool mold surfaces of the first and second mold halves under a pressure lying in the range of 10 to 30 bars (i.e., 1×10⁶ Pa to 3×10⁶ Pa).

The method of making the article 10 from the core 52 and the layers 54 and 56 comprise a small number of operations that are simple and quick to perform. They use standard equipment for performing the above-mentioned operations which are controlled very well, and therefore entirely suitable for being implemented at high production throughputs, while also guaranteeing constant quality and economic competitiveness.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A kit from which a plurality of parts are selected and arranged in a cargo vehicle to partition or divide a cargo area from a driver area in the vehicle, the kit comprising:
   a reinforced composite first panel of a cellular core sandwich-type the first panel including:
      a first portion for positioning proximate a first side of and within the vehicle:
      a first attachment portion for attaching the first portion to the first side of the vehicle; and
      a first living hinge portion disposed between the first portion and the first attachment portion to allow the first attachment portion of the first panel to pivot between positions including an attachment position in which the first portion is attached to the first side of the vehicle; and
   a reinforced composite second panel of a cellular core sandwich-type, the second panel including:
      a second portion for positioning proximate a second side of and within the vehicle;
      a second attachment portion for attaching the second portion to the second side of the vehicle;
      a door portion disposed between the first panel and the second portion;
      a second living hinge portion disposed between the second portion and the door portion to allow the door portion of the second panel to pivot between open and closed positions to allow the driver to move between the areas in the open position of the door portion; and
      a third living hinge portion disposed between the second portion and the second attachment portion to allow the second attachment portion of the second panel to pivot between positions including an attachment position in which the second portion is attached to the second side of the vehicle wherein each of the panels includes a skin made of reinforced thermoplastics material wherein the skin of the first panel at least partially forms the first living hinge portion and wherein the skin of the second panel at least partially forms the second and third living hinge portions.

2. The kit as claimed in claim 1, wherein the cargo vehicle is a cargo van.

3. The kit as claimed in claim 1, wherein each of the panels is made of a recyclable thermoplastics material.

4. The kit as claimed in claim 1, wherein each of the panels is constructed mainly of polyolefin.

5. The kit as claimed in claim 1, wherein each of the panels includes:
   a first skin having an inner surface and an outer surface, the skin being made of reinforced thermoplastics material;
   a cellular core bonded to the inner surface of the first skin and made of a thermoplastics material; and
   a second skin bonded to the cellular core and having an inner surface and an outer surface, the inner surface of the second skin being bonded to the cellular core, the second skin being made of reinforced thermoplastics material.

6. The kit as claimed in claim 5, wherein the cellular core has a honeycomb-like structure.

7. The kit as claimed in claim 5 further comprising an outer covering layer disposed on the outer surface of at least one of the skins of at least one of the panels.

8. The kit as claimed in claim 7, wherein the covering layer is made of a fabric and wherein the at least one of the panels is carpeted.

9. The kit as claimed in claim 1, wherein one of the panels is a deep-drawn panel having a cavity with a width sufficient to accommodate a seat back when the seat back is moved into a reclined position in the driver area.

10. The kit as claimed in claim 1, wherein one of the panels defines a cut-out window area.

11. The kit as claimed in claim 10 further comprising a window covering which covers the window area.

12. The kit as claimed in claim 5, wherein the skins are made of a woven fabric or a mat of glass fibers and of the thermoplastics material.

13. The kit as claimed in claim 12, wherein the thermoplastics material of the skins is polyolefin.

14. The kit as claimed in claim 1, wherein the cellular core has an open cell structure of the tubular or honeycomb cell type, constituted mainly of polyolefin.

15. The kit as claimed in claim 1, wherein each of the cellular cores has an open cell structure and wherein open cells have a diameter in the range of 2 mm to 10 mm.

16. The kit as claimed in claim 1 wherein each of the panels has a thickness between 5 mm and 30 mm.

* * * * *

UNITED STATES PATENT AND TRADEMARK OFFICE
CERTIFICATE OF CORRECTION

| | | |
|---|---|---|
| PATENT NO. | : 7,909,379 B2 | Page 1 of 1 |
| APPLICATION NO. | : 12/212700 | |
| DATED | : March 22, 2011 | |
| INVENTOR(S) | : Larry J. Winget and Darius J. Preisler | |

It is certified that error appears in the above-identified patent and that said Letters Patent is hereby corrected as shown below:

Title Page; item (75);

Delete the name of the second inventor "Darius J. Preiser"

and insert therefor -- Darius J. Preisler --.

Signed and Sealed this
Tenth Day of May, 2011

David J. Kappos
*Director of the United States Patent and Trademark Office*